US010077868B2

(12) United States Patent
Chouinard

(10) Patent No.: US 10,077,868 B2
(45) Date of Patent: Sep. 18, 2018

(54) TRUSS ADAPTER FOR MOUNTING OBJECTS ON SPACE FRAME TRUSS

(71) Applicant: Entertainment Structural Products, Inc., Essington, PA (US)

(72) Inventor: Michael P. A. Chouinard, Swarthmore, PA (US)

(73) Assignee: Entertainment Structural Products, Inc., Essington, PA (US)

( * ) Notice: Subject to any disclaimer, the term of this patent is extended or adjusted under 35 U.S.C. 154(b) by 0 days.

(21) Appl. No.: 15/612,041

(22) Filed: Jun. 2, 2017

(65) Prior Publication Data

US 2017/0268721 A1    Sep. 21, 2017

Related U.S. Application Data

(63) Continuation-in-part of application No. 15/373,540, filed on Dec. 9, 2016, now abandoned, which is a continuation of application No. 14/700,087, filed on Apr. 29, 2015, now abandoned.

(60) Provisional application No. 61/986,038, filed on Apr. 29, 2014.

(51) Int. Cl.
*F16M 13/02* (2006.01)
*F21V 21/26* (2006.01)
*F16B 2/08* (2006.01)
*F16B 2/10* (2006.01)
*E04C 3/04* (2006.01)
*H04N 5/655* (2006.01)
*H04R 1/02* (2006.01)

(52) U.S. Cl.
CPC ............. *F16M 13/027* (2013.01); *F16B 2/08* (2013.01); *F16B 2/10* (2013.01); *F16M 13/022* (2013.01); *F21V 21/26* (2013.01); *E04C 2003/0495* (2013.01); *H04N 5/655* (2013.01); *H04R 1/026* (2013.01)

(58) Field of Classification Search
CPC ...... F16M 11/10; F16M 13/02; F16M 13/027; F16M 13/022; F16B 2/10; F16B 2/08; F21V 21/26; H04R 1/026; H04N 5/655; E04C 2003/0495
USPC .................. 248/317, 288.8, 690, 489, 228.1
See application file for complete search history.

(56) References Cited

U.S. PATENT DOCUMENTS

| 2,751,175 | A | 6/1966 | Jones |
| 3,559,941 | A | 2/1971 | Holzman |
| 5,312,079 | A | 5/1994 | Little, Jr. |
| 6,406,008 | B1 | 6/2002 | Dudding |
| 6,561,471 | B1 | 5/2003 | Hawie |
| 7,780,132 | B1 | 8/2010 | Tomaric |
| 2001/0030269 | A1 | 10/2001 | Evans |
| 2002/0060280 | A1 | 5/2002 | Yaphe |
| 2006/0254190 | A1 | 11/2006 | Hunt |
| 2007/0235607 | A1 | 10/2007 | Liaw |
| 2010/0200715 | A1 | 8/2010 | Kuipers |
| 2011/0042536 | A1 | 2/2011 | Phillips |
| 2014/0103181 | A1 | 4/2014 | Duerigen |

*Primary Examiner* — Adriana Figueroa
*Assistant Examiner* — Jessie T Fonseca
(74) *Attorney, Agent, or Firm* — Olson & Cepuritis, Ltd.; William P. Oberhardt; Anita M. Cepuritis

(57) ABSTRACT

Devices for mounting objects on space frame truss or other structural members are provided.

43 Claims, 4 Drawing Sheets

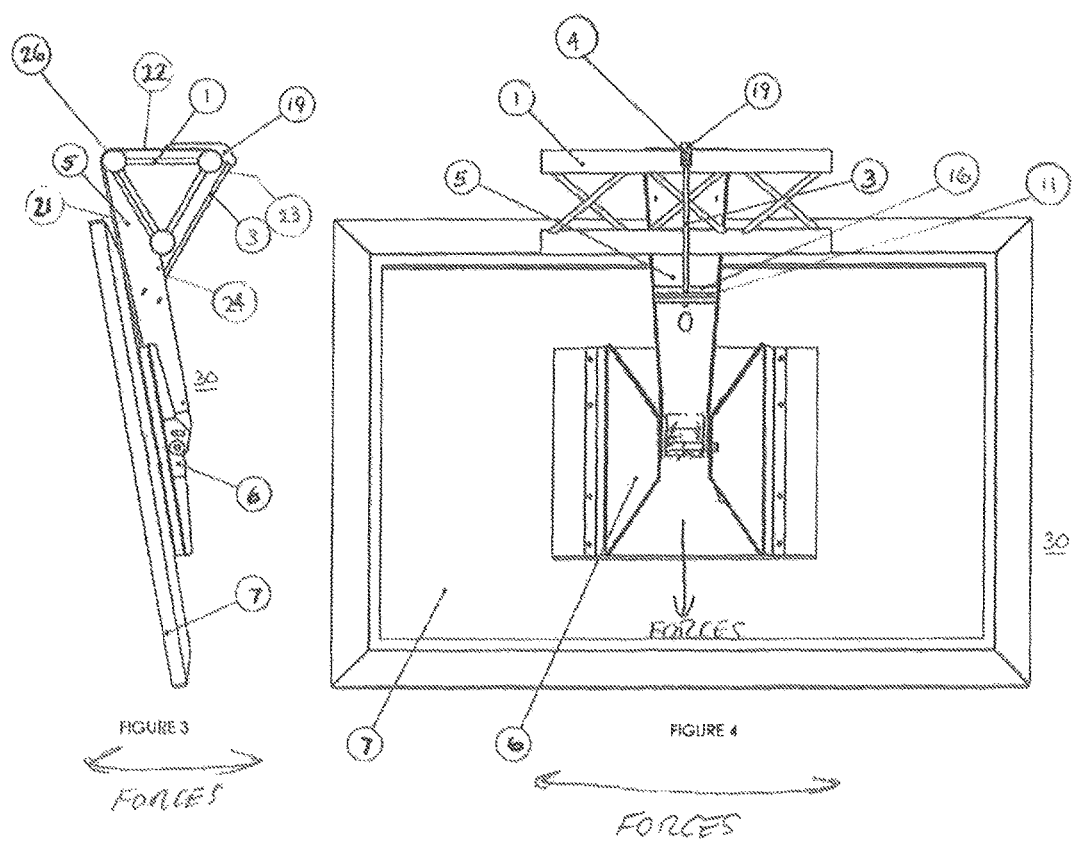

10,077,868 B2

TRUSS ADAPTER FOR MOUNTING OBJECTS ON SPACE FRAME TRUSS

RELATED APPLICATION INFORMATION

This application is a continuation-in-part of U.S. application Ser. No. 15/373,540, filed on Dec. 9, 2016, now abandoned, which, in turn, is a continuation of U.S. application Ser. No. 14/700,087, filed on Apr. 29, 2015, now abandoned, which, in turn, claims the benefit of and priority from U.S. provisional application Ser. No. 61/986,038, filed Apr. 29, 2014, all of the disclosures of which are incorporated herein by reference.

BACKGROUND OF THE INVENTION

The present invention relates to the field of hanging objects on truss. Tubular truss is used in the entertainment industry in both temporary and permanent rigging systems to hold lights, speakers, and other entertainment equipment. There is a need in the construction industry for safe ways to attach objects to truss.

BRIEF DESCRIPTION OF THE DRAWINGS

The features of the present invention are set forth with particularity in the appended claims. The present invention, both as to its organization and manner of operation, together with further objects and advantages thereof, may be best understood with reference to the following description, taken in connection with the accompanying drawings in which:

FIG. 3 is a side view of an embodiment of the present invention hanging on a piece of triangular truss;

FIG. 4 is a front view of an embodiment of the present invention hanging on a piece of truss.

DETAILED DESCRIPTION OF THE INVENTION

Figure 1:
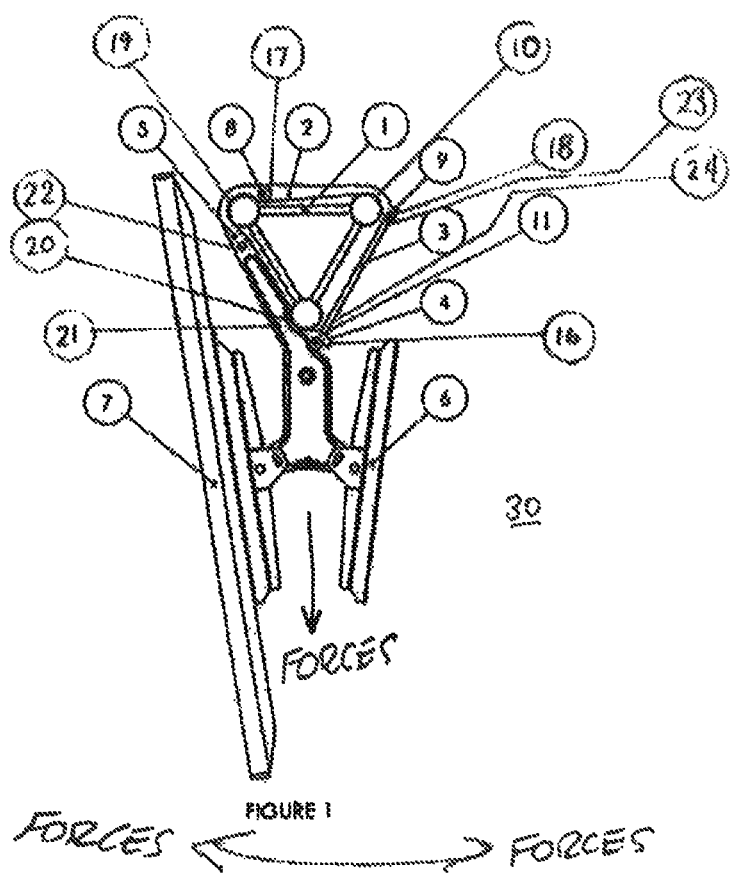
FIG. 1 is a side view of an embodiment of the present invention hanging on a piece of triangular truss.

The present invention is a device for mounting objects and coupling loads imposed by those objects to space frame trusses or beams in a manner which utilizes the full moment capacity in bending, shear and torsion of the space frame truss or other type of beam. The device in all of its embodiments entraps the cross section of the truss in such a way as to not locally load in torsion or local bending a truss chord or flange independent of the entire truss or beam structure.

Most truss mounts circumferentially clamp on a single truss chord with either a U-bolt or other type of circumferential clamp or a clamp which compresses on a flange of a beam. If a moment load is coupled through to the chord tube or flange through this attachment the local stresses in the tube or flange may become quite high as a result of the small length of engagement relative to the moment arm. This in combination with other stresses from bending or twisting of the structure that may be present become additive and cause unplanned local yielding of the structure.

Generally the choice is to hang loads from the lower truss chord or flange of a space frame truss or beam as it seems to be a convenient place to suspend a load. This may be the region of the highest tensile stress present in the structure as in triangular trusses which usually are oriented with a single chord in tension. This method can cause highly unpredictable stressing (local loading) of the structure and consequent sudden failure as an individual chord tube failure may cause a catastrophic and progressive failure of the whole structural element.

The devices of the present invention utilize the entire bending and moment capacity of the structural member as intended as the device is configured to wrap around the entire structural member and apply a light compressive load with the tensioning device present in the mount body. In this way the mount couples its loads in bending, twisting, and moment loading effectively through the entire cross section of the structural member.

A small preload applied to the tensioning device in the mount body allows a large moment loading to be applied to the mount body and coupled to the structural member without causing excessive loading of any individual truss chord.

The mounts of the present invention may be tightened so as to grip the cross section of the beam or truss so as not to slide along its length if the beam is of uniform cross section. The mount may also be loosened without removing and slid along the length to any desired position unless obstructed by some non-uniform cross sectional feature. Because the device wraps around the outer perimeter of the truss, the location of the device will not be impeded by any internal truss members.

The mounts of the present invention may be used to hang any object off of space frame truss or a beam. Objects include but are not limited to televisions, speakers, lights, or other trusses. The mounts of the present invention are also not sensitive to the orientation of the beam or truss.

FIG. 1 shows a mount (30) attached to a triangular truss (1). The mount (30) has a pivot arm (2) which contacts the chord of the truss (1) with a radiused pivot arm saddle feature (10), and pivots at first pivot (8) relative to the body (5) of the mount (30). Body (5) has a first portion (21) and a second portion (22), and a first body saddle (19) associated with the second portion (22) of the body (5) and a second body saddle (20) associated with the first portion (21) of the body (5). The pivot arm (2) has a first end (17) and a second end (18). Second pivot (9) is attached to the second end (18) of pivot arm (2). A tensioning device (3), such as a drawbolt, a ratcheting binder device a cam, a screw, or other known instrumentalities is provided. The tensioning device (3) has a first end (23) and a second end (24). The first end (23) of tensioning device (3) is attached to second pivot (9) through known instrumentalities, such as a threaded connection. Tensioning device (3) thereby pivots at the second end (18) of pivot arm (2) at second pivot (9). It connects at the protruding second end (24) of tensioning device (3), which may include protruding nut (4), by engaging a receiving portion (16) of body (5), for example, a slot (11) in the body (5). This allows the mount (30) to be preloaded when tensioning device (3), such as a drawbolt, is tightened, such as, in the case of a drawbolt, by threading into nut (4) or second pivot (9) thereby tensioning the drawbolt (3) and pulling it into (toward) the end of the slot (11) in body (5). Bracket (6) is an adapter for attaching a television (7) to the body (5) of the mount (30).

Figure 2:
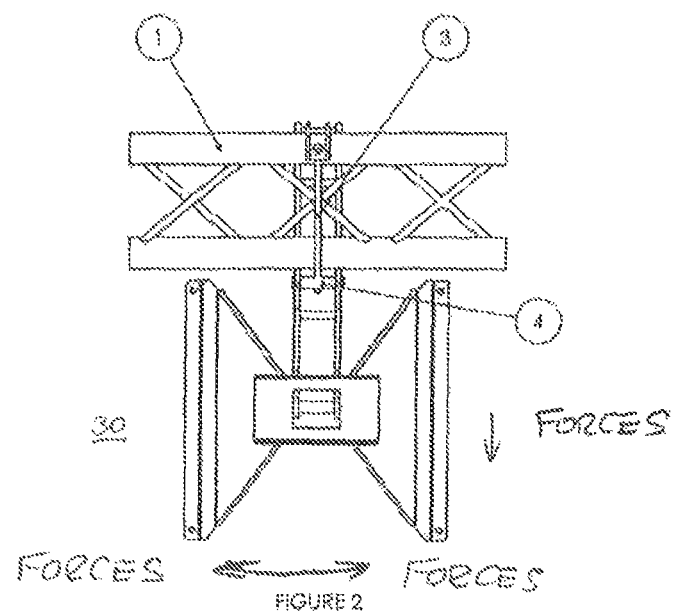
FIG. 2 is a front view of an embodiment of the present invention hanging on a piece of truss.

FIG. 2 shows a mount (30) attached to a triangular truss (1). The tensioning device (3) and nut (4) are shown in the tightened configuration to demonstrate the communication of the working loads to the entire cross section of the truss (1).

FIG. 3 shows another embodiment of the present invention, which is an unarticulated mount (30) where the body (5) of the mount (30) is a sheet of metal fabrication fit on a truss (1) with a first body saddle (19) rigidly attached to the sheet metal body (5) and a tensioning device (3), such as a drawbolt provides the necessary preload to secure the mount (30) axially on the truss (1). A body bend (26) is located between the first portion (21) of the body (5) and the second portion (22) of the body (5). This embodiment relies on the flexure of the sheet metal body (5) to partially conform to the shape of the truss (1). Bracket (6) is an adapter for attaching a television (7) to the body (5) of the mount (30).

FIG. 4 shows another view of an unarticulated mount (30) where the body (5) of the mount (30) is sheet metal fabrication fit on a truss (1) with a saddle (19) rigidly attached to the sheet metal body (5) and a drawbolt (3) provides the necessary preload to secure the mount (30) axially on the truss (1), when tensioning device (3) is engaged with receiving portion (16). This embodiment relies on the flexure of the sheet metal body (5) to partially conform to the shape of the truss (1). Bracket (6) is an adapter for attaching a television (7) to the body (5) of the mount (30).

Figure 5:
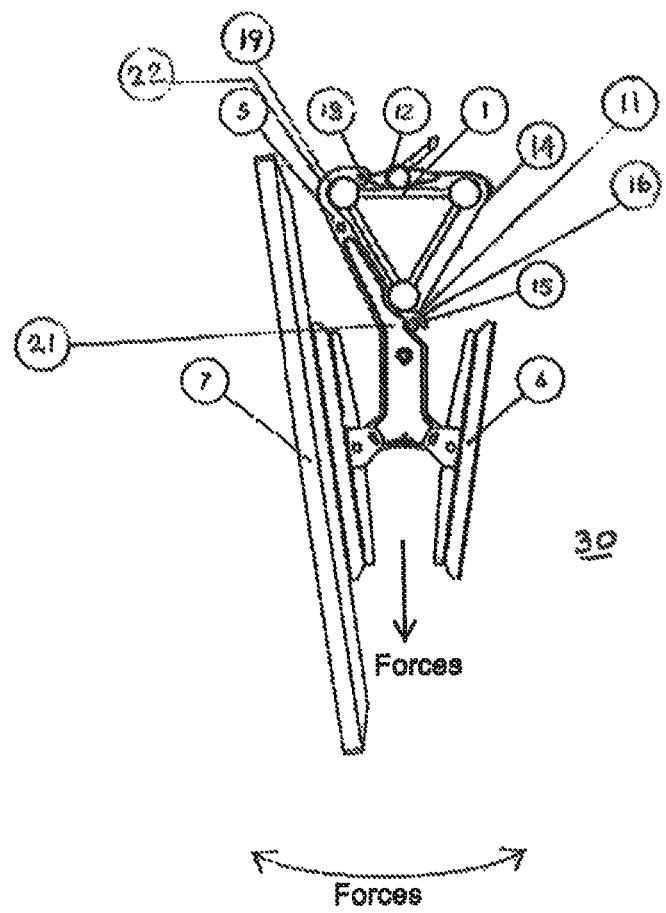
FIG. 5 is a side view of an embodiment of the present invention hanging on a piece of triangular truss.

FIG. 5 shows another embodiment of the mounts of the present invention wherein the body (5) of the mount (30) nests on the chord tubes of the truss (1), and the preload to restrain the body (5) of the mount (30) to the truss (1) is provided by a ratcheting binder apparatus (12) pivoting on a pin (13) through the body (5) thereby tensioning a flexible strap (14) which connects back to the body (5) at slot (11) via connector (15) which may be of any suitable geometry or method. Bracket (6) is an adapter for attaching a television (7) to the body (5) of the mount (30).

Various embodiments having been thus described in detail and by way of example, it will be apparent to those of skilled in the art that variations and modifications may be made and still achieve the desired outcome. The embodiments described herein include all such variations and modifications as fall within the scope of the claims.

What is claimed is:

1. A truss adapter for mounting one or more objects on a structural member, the truss adapter comprising:
   (A) a body having a first portion that is flexible, a second portion, and a receiving portion;
   (B) a rigid body saddle attached to the second portion of the body, the body saddle further including a portion of the body saddle that is engageable with the structural member on which the truss adapter is to be mounted;
   (C) a bracket attached to the first portion of the body for attachment of one or more objects to the truss adapter; and
   (D) a tensioning device that has a first end and a second end, wherein the second end of the tensioning device is engageable with the receiving portion of the body, and wherein the first end of the tensioning device is engageable with the body saddle.

2. The truss adapter of claim 1, further comprising:
   (A) the tensioning device being a drawbolt; and
   (B) the engagement between the second end of the drawbolt and the receiving portion of the body being a threaded engagement.

3. The truss adapter of claim 1, further comprising:
   (A) the tensioning device being a drawbolt; and
   (B) the engagement between the first end of the drawbolt and the body saddle being a threaded engagement.

4. The truss adapter of claim 1 wherein:
   at least the first portion of the body is made from flexible sheet metal.

5. The truss adapter of claim 4 wherein:
   (A) when the tensioning device is tightened, the distance measured along the tensioning device between the body saddle and the receiving portion of the body is shortened; and
   (B) when the tensioning device is loosened, the distance measured along the tensioning device between the body saddle and the receiving portion of the body is lengthened.

6. The truss adapter of claim 5 wherein, when the truss adapter is mounted on the structural member, and when the first end of the tensioning device is engaged with the body saddle and the second end of the tensioning device is engaged with the receiving portion of the body:
   (A) tightening the tensioning device causes the flexible first portion of the body to flex to partially conform to the shape of the structural member on which the truss adapter is mounted; and
   (B) tightening the tensioning device causes the flexible first portion of the body and the body saddle to cooperate to tighten relative to the structural member on which the truss adapter is mounted so as to prevent the truss adapter from sliding laterally along the structural member or rotating relative to the cross-section of the structural member.

7. The truss adapter of claim 1, wherein the structural member is a space frame truss having a plurality of truss chords interconnected by webbing, wherein each of the truss chords has an outer surface, with the portion of the body saddle that is engageable with the structural member further comprising:
   a radiused portion of the body saddle that is engageable with the outer surface of at least one of the truss chords of the space frame truss on which the truss adapter is to be mounted.

8. The truss adapter of claim 7 wherein the bracket is attachable to one or more objects attached from the group consisting of: televisions, speakers, and lights.

9. The truss adapter of claim 6, wherein the structural member is space frame truss having a plurality of truss chords interconnected by webbing, wherein each of the truss chords has an outer surface, and wherein:
   (A) the portion of the body saddle that is engageable with the space frame truss on which the truss adapter is to be mounted further comprises a radiused portion of the body saddle engageable with a portion of the outer surface of at least one of the truss chords of the space frame truss on which the truss adapter is to be mounted; and
   (B) the body of the truss adapter further comprises a flexible body bend located between the first portion of the body and the second portion of the body, wherein the body bend is engageable with a portion of the outer surface of at least one of the truss chords of the space frame truss on which the truss adapter is to be mounted.

10. The truss adapter of claim 9, wherein the structural member is space frame truss having a plurality of truss chords interconnected by webbing, wherein each of the truss chords has an outer surface, and wherein:
    loosening the tensioning device causes the body and the body saddle to cooperate to loosen relative to the space frame truss on which the truss adapter is mounted such that the truss adapter may slide laterally along the space frame truss without removal of the truss adapter from the space frame truss and without interference of the truss adapter with the webbing of the truss.

11. The truss adapter of claim 10 wherein the bracket is attachable to one or more objects selected from the group consisting of: televisions, speakers, and lights.

12. The truss adapter of claim 1 wherein:
the body of the truss adapter further comprises a body bend that is flexible located between the first portion of the body and the second portion of the body.

13. The truss adapter of claim 12 wherein:
the body bend of the truss adapter is engageable with the structural member on which the truss adapter is to be mounted.

14. A truss adapter for mounting one or more objects on a space frame truss having a plurality of truss chords that are interconnected by webbing, wherein each of the truss chords has an outer surface, with the truss adapter comprising:
(A) a body having a first portion that is flexible, a second portion, a body bend that is flexible located between the first portion and the second portion, and a receiving portion;
(B) a rigid body saddle attached to the second portion of the body, the body saddle further including a radiused portion engageable with a portion of the outer surface of at least one of the truss chords of the space frame truss on which the truss adapter is to be mounted;
(C) a bracket attached to the first portion of the body for attachment of one or more objects to the truss adapter;
(D) a tensioning device that has a first end and a second end, wherein the second end of the tensioning device is engageable with the receiving portion of the body, and wherein the first portion of the tensioning device is engageable with the body saddle.

15. The truss adapter of claim 14, further comprising:
the engagement between the second end of the tensioning device and the receiving portion of the body being a threaded engagement.

16. The truss adapter of claim 14, further comprising:
the engagement between the first end of the tensioning device and the body saddle being a threaded engagement.

17. The truss adapter of claim 14 wherein:
the body bend further comprises a radiused portion engageable with a portion of the outer surface of at least one of the truss chords of the space frame truss on which the truss adapter is to be mounted.

18. The truss adapter of claim 15 wherein:
at least the first portion of the body and the body bend are made of flexible sheet metal.

19. The truss adapter of claim 16 wherein:
at least the first portion of the body and the body bend are made of flexible sheet metal.

20. The truss adapter of claim 18, wherein:
(A) when the first end of the tensioning device is engaged with the body saddle and the second end of the tensioning device is engaged with the receiving portion of the body, and when the tensioning device is tightened using the threaded engagement with the receiving portion of the body, then the distance measured along the tensioning device between the body saddle and the receiving portion of the body is shortened; and
(B) when the first end of the tensioning device is engaged with the body saddle and the second end of the tensioning device is engaged with the receiving portion of the body, and when the tensioning device is loosened using the threaded engagement with the receiving portion of the body, then the distance measured along the tensioning device between the body saddle and the receiving portion of the body is lengthened.

21. The truss adapter of claim 19 wherein:
(A) when the first end of the tensioning device is engaged with the body saddle and the second end of the tensioning device is engaged with the receiving portion of the body, and when the tensioning device is tightened using the threaded engagement with the body saddle, then the distance measured along the tensioning device between the body saddle and the receiving portion of the body is shortened; and
(B) when the first end of the tensioning device is engaged with the body saddle and the second end of the tensioning device is engaged with the receiving portion of the body, and when the tensioning device is loosened using the threaded engagement with the body saddle, then the distance measured along the tensioning device between the body saddle and the receiving portion of the body is lengthened.

22. The truss adapter of claim 20 wherein, when the truss adapter is mounted on the space frame truss having a plurality of truss chords interconnected by webbing, and when the first end of the tensioning device is engaged with the body saddle and the second end of the tensioning device is engaged with the receiving portion of the body:
(A) tightening the tensioning device causes the flexible first portion and the flexible body bend to partially conform to the shape of the space frame truss on which truss adapter is mounted;
(B) tightening the tensioning device causes the flexible first portion of the body, the body bend, and the body saddle to tighten relative to the space frame truss on which the truss adapter is mounted so as to prevent the truss adapter from sliding laterally along the space frame truss or rotating relative to the cross-section of the space frame truss; and
(C) loosening the tensioning device causes the flexible first portion of the body, the body bend, and the body saddle to cooperate to loosen relative to the space frame truss on which the truss adapter is mounted.

23. The truss adapter of claim 21 wherein, when the truss adapter is mounted on the space frame truss having a plurality of truss chords interconnected by webbing, and when the first end of the tensioning device is engaged with the body saddle and the second end of the tensioning device is engaged with the receiving portion of the body:
(A) tightening the tensioning device causes the flexible first portion and the flexible body bend to partially conform to the shape of the space frame truss on which truss adapter is mounted;
(B) tightening the tensioning device causes the flexible first portion of the body, the body bend, and the body saddle to tighten relative to the space frame truss on which the truss adapter is mounted so as to prevent the truss adapter from sliding laterally along the space frame truss or rotating relative to the cross-section of the space frame truss; and
(C) loosening the tensioning device causes the flexible first portion of the body, the body bend, and the body saddle to cooperate to loosen relative to the space frame truss on which the truss adapter is mounted.

24. The truss adapter of claim 22 wherein:
loosening the tensioning device allows the truss adapter to slide laterally along the space frame truss on which it is mounted without removal of the truss adapter from the space frame truss and without interference between the truss adapter and the webbing interconnecting the truss chords of the space frame truss.

25. The truss adapter of claim 23 wherein:
loosening the tensioning device allows the truss adapter to slide laterally along the space frame truss on which it is mounted without removal of the truss adapter from the space frame truss and without interference between the truss adapter and the webbing interconnecting the truss chords of the space frame truss.

26. The truss adapter of claim 18 wherein the bracket is attachable to one or more objects selected from the group consisting of: televisions, speakers, and lights.

27. A truss adapter for mounting one or more objects on space frame truss having a plurality of truss chords that are interconnected by webbing, wherein each of the truss chords has an outer surface, with the truss adapter comprising:
(A) a body that has a first portion, a second portion, and a receiving portion, wherein the first portion of the body includes a bracket for attachment of one or more objects to the body of the truss adapter;
(B) a first pivot attached to the second portion of the body in a manner that permits the first pivot to swivel at least partially relative to the second portion of the body;
(C) a pivot arm having a first end and a second end, wherein the first end of the pivot arm is attached to the first pivot of the body in a manner that permits the pivot arm to swivel at least partially relative to the second portion of the body;
(D) a second pivot attached to the second end of the pivot arm in a manner that permits the second pivot to swivel at least partially relative to the second end of the pivot arm; and
(E) a tensioning device that has a first end and a second end, wherein the first end of the tensioning device is engageable with the second pivot of the pivot arm in a manner that permits the tensioning device to swivel at least partially relative to the second end of the swivel arm, and wherein the second end of the tensioning device is engageable with the receiving portion of the body.

28. The truss adapter of claim 27 wherein:
(A) when the first end of the tensioning device is engaged with the second pivot, and the second end of the tensioning device is engaged with the receiving portion of the body, the tensioning device may be loosened between the second pivot and the receiving portion of the body, thereby lengthening the distance measured along the tensioning device between the second pivot and the receiving portion of the body; and
(B) when the first end of the tensioning device is engaged with the second pivot, and the second end of the tensioning device is engaged with the receiving portion of the body, the tensioning device may be tightened between the second pivot and the receiving portion of the body, thereby shortening the distance measured along the tensioning device between the second pivot and the receiving portion of the body.

29. The truss adapter of claim 28 wherein the pivot arm further comprises:
a radiused portion, wherein the radiused portion of the pivot arm saddle is engageable with a portion of the outer surface of at least one of the truss chords of the space frame truss on which the truss adapter is to be mounted.

30. The truss adapter of claim 29 wherein the second portion of the body further comprises:
a first body saddle which has a radiused portion, wherein the radiused portion of the first body saddle is engageable with a portion of the outer surface of at least one of the truss chords of the space frame truss on which the truss adapter is to be mounted.

31. The truss adapter of claim 30 wherein the first portion of the body further comprises:
a second body saddle which has a radiused portion, wherein the radiused portion of the second body saddle is engageable with a portion of the outer surface of at least one of the truss chords of the space frame truss on which the truss adapter is to be mounted.

32. The truss adapter of claim 28 wherein:
(A) the tensioning device further comprises a drawbolt; and
(B) the second end of the drawbolt is threadedly engageable with the receiving portion of the body.

33. The truss adapter of claim 28 wherein:
(A) the tensioning device further comprises a drawbolt; and
(B) the first end of the drawbolt is threadedly engageable with the second pivot.

34. The truss adapter of claim 28, wherein:
(A) when the tensioning device is tightened between the second pivot and the receiving portion of the body, then the body and pivot arm of the truss adapter cooperate to tighten relative to the space frame truss on which the truss adapter is to be mounted; and
(B) when the tensioning device is loosened between the second pivot and the receiving portion of the body, then the body and pivot arm of the truss adapter cooperate to loosen relative to the space frame truss on which the truss adapter is to be mounted.

35. The truss adapter of claim 34 wherein the bracket is attachable to one or more objects selected from the group consisting of: televisions, speakers, and lights.

36. The truss adapter of claim 31 wherein, when the truss adapter is mounted on the space frame truss having a plurality of truss chords that are interconnected by webbing:
(A) the first body saddle is engaged with at least one of the truss chords; and
(B) the second body saddle is engaged with at least one different truss chord than the truss chord with which the first body saddle is engaged.

37. The truss adapter of claim 32 wherein, when the truss adapter is mounted on the space frame truss having a plurality of truss chords interconnected by webbing:
(A) the drawbolt may be loosened between the second pivot and the receiving portion of the body, resulting in the body and the pivot arm loosening relative to the space frame truss such that the truss adapter may slide laterally along the space frame truss without removal of the truss adapter from the space frame truss and without interference of the truss adapter with the webbing of the truss; and
(B) the drawbolt may be tightened between the second pivot and the receiving portion of the body, resulting in the body and the pivot arm tightening relative to the space frame truss such that the truss adapter will not slide laterally along the space frame truss or rotate relative to the cross-section of the space frame truss.

38. The truss adapter of claim 33 wherein, when the truss adapter is mounted on the space frame truss having a plurality of truss chords interconnected by webbing:
(A) the drawbolt may be loosened between the second pivot and the receiving portion of the body, resulting in the body and the pivot arm loosening relative to the space frame truss such that the truss adapter may slide laterally along the space frame truss without removal of the truss adapter from the space frame truss and without interference of the truss adapter with the webbing of the truss; and (B) the drawbolt may be tightened between the second pivot and the receiving portion of the body, resulting in the body and the pivot arm tightening relative to the space frame truss such that the truss adapter will not slide laterally along the space frame truss or rotate relative to the cross-section of the space frame truss.

39. The truss adapter of claim 37, wherein:

(A) when the drawbolt is tightened between the second pivot and the receiving portion, then the body and pivot arm of the truss adapter cooperate to tighten relative to the space frame truss on which the truss adapter is to be mounted; and (B) when the drawbolt is loosened between the second pivot and the receiving portion, then the body and pivot arm of the truss adapter cooperate to loosen relative to the space frame truss on which the truss adapter is to be mounted.

40. The truss adapter of claim 38, wherein:

(A) when the drawbolt is tightened between the second pivot and the receiving portion, then the body and pivot arm of the truss adapter cooperate to tighten relative to the space frame truss on which the truss adapter is to be mounted; and (B) when the drawbolt is loosened between the second pivot, then the body and pivot arm of the truss adapter cooperate to loosen relative to the space frame truss on which the truss adapter is to be mounted.

41. The truss adapter of claim 31, wherein, when the truss adapter is mounted on space frame truss having at least three truss chords that are interconnected by webbing, and when the first end of the tensioning device is engaged with the second pivot and the second end of the tensioning device is engaged with the receiving portion of the body, and when the tensioning device is tightened between the second pivot and the receiving portion, the truss adapter further comprises:

(A) the first body saddle being engaged with at least one of the truss chords;

(B) the second body saddle being engaged with at least one different truss chord than the truss chord with which the first body saddle is engaged; and (C) the pivot arm saddle being engaged with (i) at least one different truss chord than the truss chord with which the first body saddle is engaged, and (ii) at least one different truss chord than the truss chord with which the second body saddle is engaged.

42. The truss adapter of claim 38 wherein the bracket is attachable to one or more objects selected from the group consisting of: televisions, speakers, and lights.

43. The truss adapter of claim 39 wherein the bracket is attachable to one or more objects selected from the group consisting of: televisions, speakers, and lights.

* * * * *